United States Patent [19]

Meixner et al.

[11] Patent Number: 4,831,259

[45] Date of Patent: May 16, 1989

[54] PYRODETECTOR SUITED FOR MOVEMENT-SELECTIVE AND DIRECTION-SELECTIVE DETECTION

[75] Inventors: Hans Meixner, Haar; Gerhard Mader, Unterhaching; Reinhard Freitag, Munich, all of Fed. Rep. of Germany

[73] Assignee: Siemens Aktiengesellschaft, Berlin and Munich, Fed. Rep. of Germany

[21] Appl. No.: 49,281

[22] Filed: May 13, 1987

[30] Foreign Application Priority Data

May 15, 1986 [DE] Fed. Rep. of Germany ....... 3616374

[51] Int. Cl.$^4$ .................... G01J 5/06

[52] U.S. Cl. .................... 250/353; 250/349; 250/338.3

[58] Field of Search .................... 250/353, 349, 338.1, 250/338.3

[56] References Cited

U.S. PATENT DOCUMENTS

| | | | |
|---|---|---|---|
| 3,453,432 | 7/1969 | McHenry | 250/338.3 |
| 3,958,118 | 5/1976 | Schwarz | 250/221 |
| 4,052,616 | 10/1977 | Keller | 250/353 |
| 4,058,726 | 11/1977 | Paschedag et al. | 250/342 |
| 4,225,786 | 9/1980 | Perlman | 250/342 |
| 4,404,468 | 9/1983 | Kleinschmidt | 250/342 |
| 4,716,294 | 12/1987 | Pettke et al. | 250/353 |

FOREIGN PATENT DOCUMENTS

| | | |
|---|---|---|
| 3205394 | 8/1983 | Fed. Rep. of Germany . |
| 2146503 | 4/1985 | United Kingdom . |

OTHER PUBLICATIONS

Electronics International, "Thin film cuts time of detector response", Jun. 82, vol. 55, pp. 84–86.

*Primary Examiner*—Carolyn E. Fields
*Assistant Examiner*—John A. Miller
*Attorney, Agent, or Firm*—Hill, Van Santen, Steadman & Simpson

[57] ABSTRACT

A pyrodetector, which is both movement selective and directional selective, has preferably a foil supporting detector elements relative to a concave mirror which may have a spherical curve surface, a spherical-parabolic curve surface or a curve surface between a spherical surface and a spherical-parabolic surface. The sensor is preferably a plurality of individual sensor elements which are arranged on an arc, preferably on a planar member or a foil, and may include additional or second sensor elements having electrodes which are for determining temperature compensation for the detector.

26 Claims, 3 Drawing Sheets

PYRODETECTOR SUITED FOR MOVEMENT-SELECTIVE AND DIRECTION-SELECTIVE DETECTION

BACKGROUND OF THE INVENTION

The present invention is directed to a pyrodetector for the detection of a body which has a temperature differing from that of the environment and includes a concave mirror having a great circle and a sensor which has electrical connections arranged in a circular arc concentric with reference to the great circle of the mirror on a pyro-electric foil with the circular arc coinciding with the plane of the directional selectivity.

An infrared detector is disclosed in U.S. Pat. No. 4,225,786, whose disclosure is incorporated by reference. The detector of this patent has a spherical mirror and a sensor which is constructed to extend over a circular arc and which is located on a heat-insulating carrier. The arc of the sensor is a circular arc coaxial with the spherical mirror and comprises the distance of the focal length F from the mirror surface of the spherical mirror. One embodiment of this sensor has a centrally arranged sensor element and respectively additional sensor elements arranged laterally therefrom which are connected in parallel and are connected in a bridge relative to the centrally arranged sensor element. Otherwise, the sensor of this patent is a single sensor element extending over a circular arc. This arc-shaped sensor and the spherical mirror defines the reception direction characteristics of the known detector which is wide-angled with reference to the plane of the arc and is potentially only slightly wide-angled by contrast in a direction perpendicular thereto For example, a polyvinylidene fluoride (PVDF) foil is provided for the sensor and this has the pyro-electrical properties. Given temperature modifications of the material of the foil, the electrical voltage can be taken between two electrodes, which are arranged on two opposite surfaces of the foil, and the voltage will change in response to the degree of the temperature modification. In applications of a pyrodetector, the foil, or one and/or the other electrode as well, is used as an absorption surface for heat radiations so that the signal to be taken at the electrode is measured for the absorbed heat.

A pyrodetector that has a strict directional characteristic is disclosed in U.S. Pat. No. 4,404,468, whose disclosure is incorporated by reference. This pyrodetector comprises a parabolic mirror in which two sensors differing in function are arranged. The one sensor is positioned in the focal point of the parabolic mirror and serves the purpose of detecting the radiation of a subject. The other sensor serves as a temperature compensator and is arranged outside any and all focal points of the mirror for radiation incident from the intended direction. The pyrodetector, thus, has a single focal point detector for detection of any and all signal heat radiations of a subject to be detected which is to be received.

The sensor of this known pyrodetector is a PVDF foil comprising electrodes situated thereon which are employed for the signal pick-up in the way already set forth hereinabove. This sensor, which is flat, can be arranged in the pyrodetector so that the radiation reflected in the parabolic mirror proportionally impinges the two surfaces of the foil so that the plane of the sensor coincides with the central axis of the parabolic mirror. This axis is also tee axis of the single reception direction for the detector.

SUMMARY OF THE INVENTION

An object of the present invention is to provide a, nonetheless, simple structure for an extremely high-performance, wide-angle pyrodetector. The object is an improvement to develop such a pyrodetector to the effect that this optionally detects direction-selective in essentially one plane.

To accomplish these goals, the present invention is directed to a pyrodetector for the detection of a body which has a temperature differing from that of its environment, said detector including a concave mirror having a curve surface with a great circle having a plane, said curve surface of the mirror having an optical axis and having a wide-angle property essentially in the one plane, said curve surface being a surface selected from a group consisting of a spherical surfaces, a spherical-parabolic surface, and a curve surface between a spherical surface and a spherical-parabolic surface, a sensor being arranged on a circular arc on a pyro-electric foil, said sensor being provided with electrical connections, and support means for positioning the foil of the sensor in a self-supporting fashion at least in the region of the sensor function, said support means positioning the foil in a plane in the mirror coinciding with the plane of the great circle of the mirror with the optical axis of the mirror being in the plane of the foil and the circular arc being concentric with the curved surface of the mirror and coinciding with the plane of the directionally selectivity.

Arranged in the mirror, the pyrodetector of the invention comprises a new type of sensor. On embodiment, for instance, like the pyrodetector of U.S. Pat. No. 4,225,786, has a spherical mirror. In another embodiment, which is a comparatively higher performance embodiment, the mirror defined is a spherical-parabolic mirror. The concave mirror has a reflector surface that occurs as a generated surface when a parabola is turned or, respectively, rotated by an angle of up to +90° and −90° for a total of 180° around a defined rotational axis. This rotational or second axis is defined as an axis which lies in the plane of the parabola which is to be rotated and which second axis is directed perpendicular to the axis of symmetry of the parabola at a distance greater than the distance of the focal length of the parabola from an apex of tee parabola and preferably twice the distance of the focal length from the apex.

Apart from the two specific embodiments of mirrors, intermediate forms can also be advantageous on a case-by-case basis, which will be discussed hereinafter.

In the pyrodetector of the invention, the sensor is arranged in the concave surface relative to the concave surface of the mirror so that the parts of the sensor cause only little shadowing. In a detector in accordance with the development of the invention, this sensor, in contrast to the detector of U.S. Pat. No. 4,225,786, is a true array which comprises a plurality of individual sensor elements arranged on a foil. In the invention, this foil of the sensor array is arranged by the support means to be planarly directed in the spherical or spherical-parabolic mirror. This arrangement has the advantage that not only the individual sensor elements, but the entire array of sensor elements can be arranged in either the spherical or the spherical-parabolic mirror with only minimum shadowing of the detector radiation to be received from any direction being present, regardless of whether non-selective wide-angle reception is provided or whether direction-selective reception is desired in an appropriately wide-angle range. The sensor elements of the array can also be arranged on a circular arc in the present invention, but not in one plane.

In the present invention, the plane of the circular arc or, respectively, of the sensor elements coincides with the plane of the reception or, respectively, directional selectivity of the pyrodetector of the invention. The axis of symmetry of the respective mirror also lies in this plane. Given a spherical mirror, this is preferably a spherical rectangle in the invention, whose greatest rectangular length a or, respectively, rectangular side is parallel to the plane of the directional selectivity. The other rectangular length b of the mirror, which is directed perpendicular to this plane, is thereby preferably dimensioned smaller by contrast than the rectangular length b of he spherical rectangle which can meaningfully amount of up to ±90°, i.e, it can be up to the size of a semi-circle of a spherical shape of the mirror. The wide-angle selectivity up to ±60° is thus achieved. Smaller sizes of b reduces this angle of sensitivity. An angle above ±90° leads to shadowing. In the plane of the directional selectivity, thus, the pyrodetector of the present invention is a wide-angle detector which can, nonetheless, be employed as a directional-selective detector. The dimension of about ±40° is optimal for the length of dimension b. The smaller dimension leads to a correspondingly reduced sensitivity. Due to the increasing aberration errors, a large dimension would be more likely to lead to disadvantages.

Other advantages and objects of the present invention will be readily apparent from the following description, drawings and claims.

FIG. *6a* is a side view o a spherical-parabolic mirror utilizing the detector of the present invention;

FIG. *6b* is a front view of the mirror of FIG. *6a;* and

FIG. *6c* is a plan view of the mirror of FIG. *6a.*

DETAILED DESCRIPTION

Figure 1:
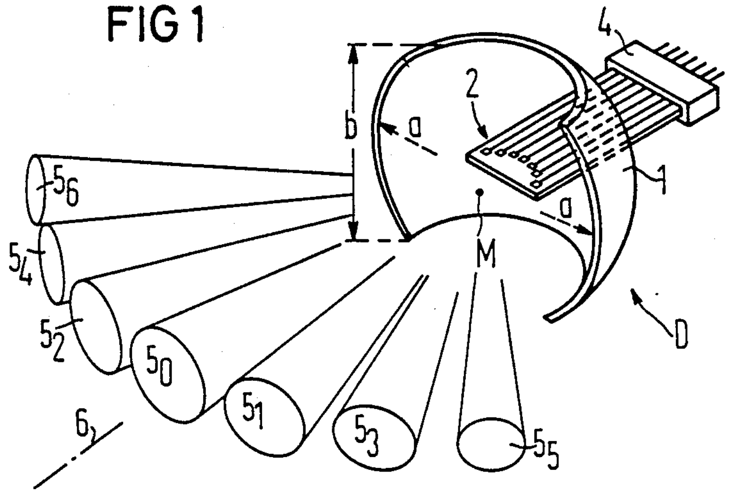
FIG. 1 is a perspective view of a pyrodetector in accordance with the present invention.

The principals of the present invention are particularly useful when incorporated in a detector generally indicated at D in FIG. 1. The detector D has a spherical mirror 1 which is a portion of a spherical surface having a spherical center M. This portion is a spherical rectangle and receives a sensor which is generally indicated at 2 and is a plurality of sensor elements forming an array. The sensor 2 has a flat planar shape and, as may be seen from FIG. 1, extends into the spherical mirror from a back side and has a rear end which is fashioned with a connector element 4.

The spherical rectangle of the spherical mirror 1 has a dimension a which is greater than a dimension b and extends parallel and lies in a plane of the array of the sensor 2. The dimension b extends perpendicular to the plane of the sensor 2 and, thus, is parallel to a normal of the vector of the plane. In accordance with the size of the dimension a, the detector D has a pronounced wide-angle behavior for the reception sensitivity relative to the plane of the sensor array 2. In the direction perpendicular thereto, the angle of the aperture of the sensitivity of the detector D is significantly smaller. Only by way of analogy are radiation lobes $5_0$–$5_6$ indicated in FIG. 1, wherein the reception of the lobe $5_0$ fundamentally belongs to a sensor element $3_0$ (see FIGS. 2 and 3), and the reception of the lobe $5_1$ belongs to a sensor $3_1$, etc., as illustrated in FIGS. 2 and 3.

Figure 2:
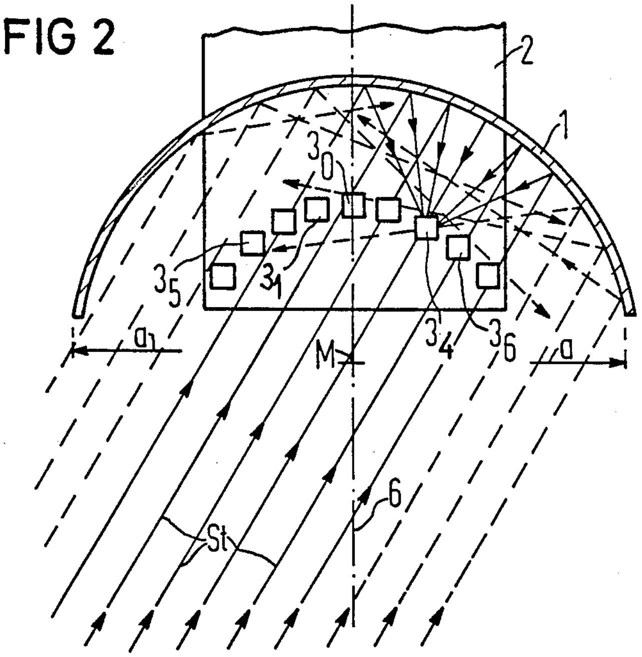
FIG. 2 is a cross sectional view through the detector of FIG. 1 taken on the plane of the sensor array.

FIG. 2 shows a spherical mirror in section, and the section plane lies in what is an upper surface of the sensor 2. The sensor 2 or the array 2 has the sensor elements $3_0$–$3_6$, which are arranged on a curve about an axis 6 of symmetry for the mirror 1 and the array of elements.

If radiation St is incident at an angle of, for example, 30° relative to the symmetry axis 6, it is focused onto the locus of the sensor element $3_4$, and this radiation St comes from a subject to be detected. Only the more outwardly incident radiation shown in broken lines is not focused precisely onto the sensor element $3_4$ and, correspondingly, it contributes less to the reception signal. For other directions or, respectively reception of lobes $5_0$, $5_1$ . . . $5_6$, the focussing will occur at the focus of the sensor or location of each of the sensor elements $3_0$, $3_1$ . . . $3_6$. The sensor elements $3_0$–$3_6$ lie on the above mentioned circular arc K (FIG. 3), which is concentric with the circular arc of the spherical mirror 1 and a center of curvature of the arc K and the sensor elements, as well as the spherical mirror, is referenced M and lies on the symmetry axis 6.

Figure 3:
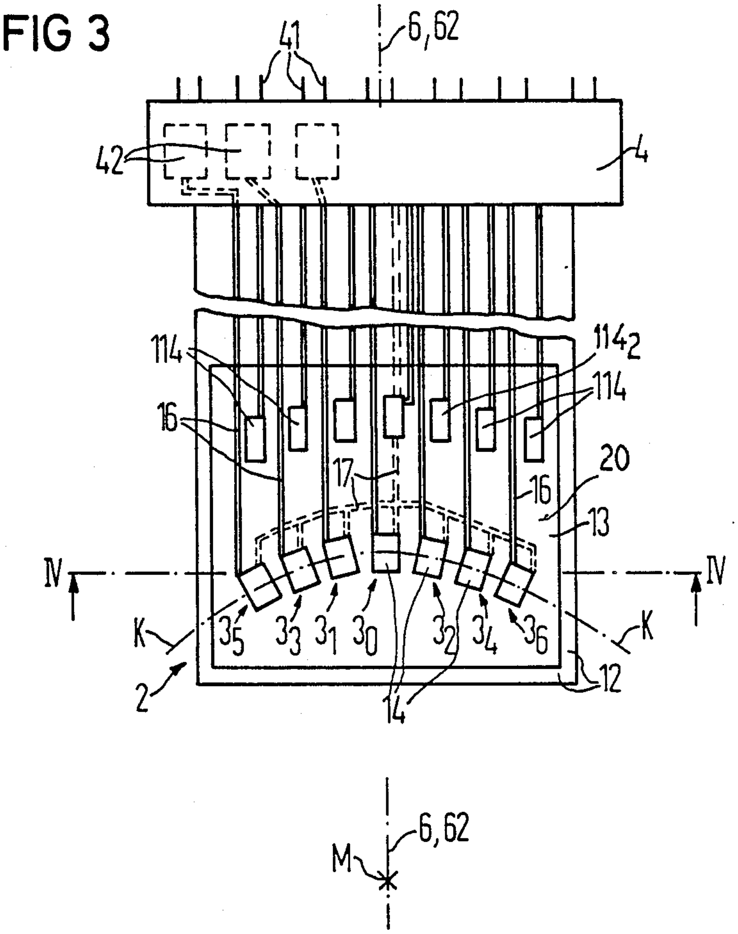
FIG. 3 is a plan view of the sensor array employed for the pyrodetector of the present invention.

The structure of the sensors 2 is shown in greater detail in FIG. 3 and comprises sensor elements $3_0$, $3_1$ . . . $3_6$. The sensor elements are a part of a pyro-electric carrier foil 20, for example a PVDF foil or a foil composed of a pyro-electric ceramic. The carrier foil can also be some other thin foil, for example, a foil of silicon, aluminum or the like, to which a pyro-electric material has been applied, for example, a layer of lead titanate on a silicon foil. Given such an embodiment, there is a possibility of etching the carrier foil away into the regions of each of the individual sensor elements so that the elements are stretched over a frame formed by the remaining portions of the foil.

The sensor elements such as $3_0$–$3_6$ typically have an area in a range of 0.5 to 5 $mm^2$. Also, the distance between two neighboring sensor elements can amount up to 1 mm.

Figure 4:
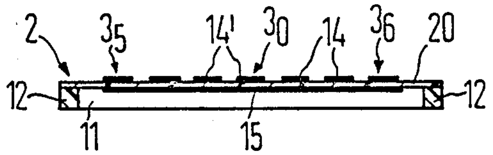
FIG. 4 is a cross sectional view taken along the lines IV—IV of FIG. 3.

The means for supporting the sensing elements includes a lamina or plate 11, which is made of, for example, plastic. The front end of the plate (FIG. 3) is fashioned as a frame 12 having an inner opening 13. The PVDF foil 20 is stretched over this frame 12 and across the opening 13 and the foil is then secured to the frame at its edges to cover the opening. The sensor elements $3_0$–$3_6$ are then formed by respective pairs of electrodes on which the respective upward situated or top electrode 14 is visible in FIG. 3. A cooperating electrode can be provided and arranged as individual electrodes positioned directly beneath each of the upper electrodes. An overall electrode, such as an electrode 15 of FIG. 4, can be congruent with all the electrodes 14. As illustrated in FIG. 3, each of the electrodes 14 has a lead 16 and the cooperating electrode 15, whether it is a single electrode as illustrated in FIG. 4, or individual electrodes, has a single lead 17. The leads 16 are preferably arranged so that the capacity between the leads 16 is a minimum. Such a sensor element 3 thus has a pyroelectric sensitivity practically, respectively in the region of the electrodes 14 and 15 which lie opposite one another. In accordance with the arrangement of the sensor elements $3_0$–$3_6$, the electrodes 14 and, thus, the bottom electrode 15 are arranged on the indicated circular arc K which has the center M.

The actual position of the individual electrodes 14 and 15 of the individual sensors 3 may be seen from FIG. 4. The foil 20 is visible in cross section and extends between the electrodes 14 and 15. The entire sensor element 2 is arranged relative to the mirror 1 so that the foil is situated in the plane of the great circle of the mirror 1, namely that the great circle thus lies in the plane of the wide-angle sensitivity and the plane of the illustration in FIG. 2. Each of the sensor elements $3_0$–$3_6$ of the sensor 2 is separately connectable via terminal pins 41 of the connector 4 and, as illustrated, each of the leads 16 has an individual preamplifier 42.

The operation of the pyrodetector of the invention can be executed in such a fashion that the individual sensor elements are interrogated in a chronological series so that the overall wide-angle reception characteristic can be interrogated in view of the individual angular ranges. In a pyrodetector of the invention, however, all sensor elements $3_0$–$3_6$ of the array 2 can also be simultaneously interrogated.

The structure shown in FIGS. 3 and 4 guarantees that the individual sensors $3_0$–$3_6$ have only minimum heat dissipation via the mount, so that they can register the actual radiation incidence error-free. The arrangement of the sensor 2 comprising the mirror 1 provided in accordance with FIG. 1 guarantees a minimum of shadowing of the incident radiation to be detected.

In FIG. 3, additional or second electrodes, such as 114, are also provided and are situated on the surface of the pyroelectric foil within the opening 13 of the frame 12. In comparison to FIG. 4, a single cooperative electrode is provided on a back surface or bottom surface of the foil 20. Moreover, let is also be pointed out that these additional electrodes 114 are not taken into consideration in the sectional view of FIG. 4.

The second electrodes 114, together with their cooperating electrodes form compensational sensors which were also fundamentally disclosed in the above-mentioned U.S. Pat. No. 4,404,468. These compensational sensors essentially serve the purpose of eliminating general temperature influences or, respectively, general temperature modifications of the sensor 2. These compensation elements or, respectively, their second electrodes 114 are arranged at such a location of the surface of the carrier foil 20 that in any case, these second electrodes 114 lie outside of the focal point of the incident radiation to be detected. For undirected reception, namely when all the first electrodes 14 of the sensor 3 are connected in parallel, the corresponding compensation sensor elements of the second electrodes 114 are also connected in parallel. For direction-selective reception, the compensation occurs between a sensor element, for example, element $3_2$ and a corresponding sensor element of the second electrodes $114_2$. The area of the electrode 14 and the area of an electrode 114 are preferably dimensioned to be of the same size so that the appertaining sensor elements have the same sensitivity. Corresponding electrical corrections are provided for other area ratios. Let it be pointed out that it is essential only that the size or area is the same and not the shape, and this can be seen from a comparison of the electrodes 114 and 14 in FIG. 3.

As illustrated in FIG. 3, the electrodes 114 of the compensation sensor elements are on an arc-shaped line relative to the center M outside of the arc K of focussing. Fundamentally, these electrodes 114 can be arranged within the arc K. A preferred location for the electrodes 114 is a circular arc around the point M comprising a radius equal to about twice the radius of the arc K.

Figure 5:
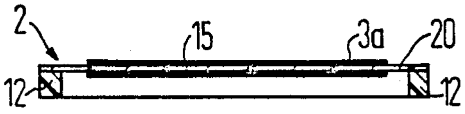
FIG. 5 is a cross sectional view similar to FIG. 4 of an embodiment of the detector ray of FIG. 3 and which detector array is non-directional selective, but is equipped with optimized reception sensitivity.

In the embodiment illustrated in FIG. 5, the sensor 2 comprises a single arc-shaped sensor element **3*a* instead of the plurality of individual connected sensor elements $3_0 \ldots 3_6$. Further details of this illustration analogously correspond to the explanation provided with regard to FIGS. 3 and 4**. This embodiment is non directional selective but is wide-angle sensitive.

Figure 6A:
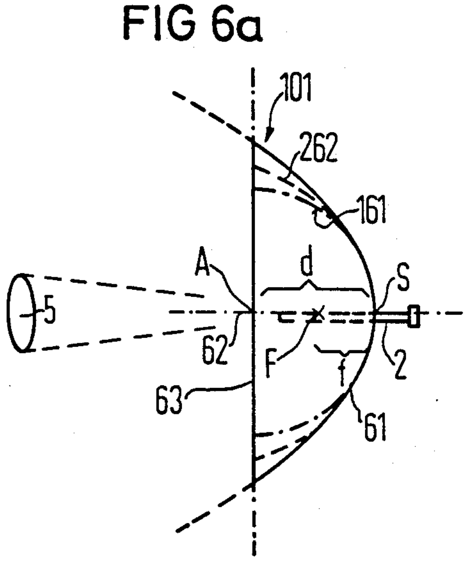
Figure 6C:
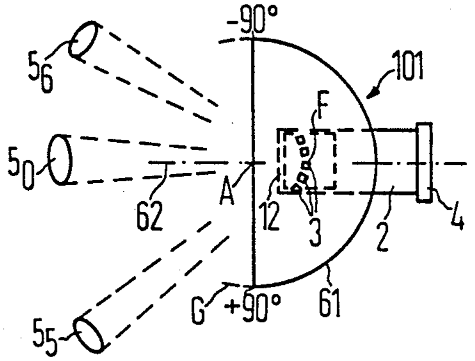
Figure 6B:
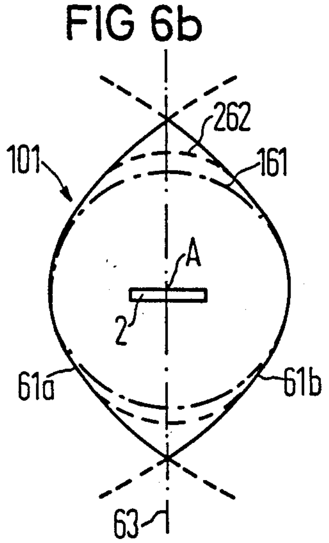

In the previous embodiment, the mirror was a spherical curve surface. In the embodiment in FIGS. **6*a*–6*c*, additional mirror shapes, such as a spherical parabola 101, are illustrated. In FIG. 6*a*, a parabola 61 is illustrated and has an axis of symmetry 62. In addition, a straight line 63 forms the rotational or second axis for the parabola 61 and intersect axis 62 at point A. The parabola 61 has an apex S and has a focal point F with a focal length f. A spacing d of the rotational axis 63 from the apex S is equal to twice the focal length f. As mentioned, FIG. 6*a* shows a side view of the spherical-parabolic mirror 101 of the invention. As illustrated in FIG. 6*b*, a front view of the mirror 101 shows that the parabola 61 of FIG. 6*a* has been rotated by +90° and −90° around the rotational axis 63 relative to the plane of illustration of FIG. 6*a*. The portions of the parabolas 61*a* and 61*b* of the parabola 61 are shown in broken lines on our imaginary continuation of these parabolas and are not a physical part of this spherical-parabolic mirror 101 produced in FIGS. 6*a*–6*c*. The point A of FIG. 6*b* is identical to the point A of FIG. 6*a* and the focal point F and the apex S of the parabola of the mirror 101 lie behind the point A of Fig. 6*b*. In FIG. 6*c*, a plan view of the mirror 101 of FIG. 6*a* is illustrated. In accordance with a +90° and −90° amount of rotation of the parabola 61 on the line 63, a semi-circular section and, namely, a great circle G for the mirror 101 is provided. This great circle G o the mirror 101 is simultaneously in the plane in which the sensor 2 is to be applied with the sensor elements 3. The sensor 2 is illustrated in FIGS. 6*a* and 6*c*** in broken lines, since it will be hidden by the portion of the mirror.

The spherical-parabolic mirror leads to an especially high sensitivity of the pyrodetector of the invention. Just like the mirror 1, this mirror 101 has its great wide-angle sensitivity in the plane of the great circle G, which is on the horizontal plane which is perpendicular to the plane of the illustration in FIGS. **6*a* and 6*b*. The axis 62 lies in the horizontal plane and the mirror 101 also has relatively little wide-angle reception behavior. As a consequence, however, of the parabolic reflective behavior of the mirror 101 in this regard, however, the maximum mirror aperture, which is the area between the two parabolas 61*a* and 61*b* of FIG. 6*b***, can be practically fully exploited to the greatest possible degree.

Based on FIG. 1, the corresponding reception lobes such as 5 or, respectively, $5_0$, $5_5$ and $5_6$ are illustrated in FIGS. **6*a* and 6*c***.

The shape of the spherical mirror is shown by dot-lines 161 of FIGS. *6a* and *6b*. Intermediate forms, likewise, come into consideration for the present invention, are also shown with broken lines 262, and these have an effective focussing of incident radiation corresponding thereto which lies between the parabolic shape 61 and the spherical shape 161. In other words, the reference to the height of the detection selectivity or, respectively, direction sensitivity, i.e., in view of the vertical direction in FIGS. *6a* and *6b* will be between those of the mirrors 161 and the spherical parabolic mirror 101.

A number of effects can be used in order to effect an adequately high absorption of the detection radiation in the sensor 2 or, respectively, in the sensor elements such as $3_0$–$3_6$. As mentioned above, the PVDF foil is absorbent for the infrared radiation to be detected, which is relevant here. It is recommendable to coat the electrodes, such as 14 and 114, or, respectively, the surface of the foil with a protective layer of a varnish such as zapon varnish. The varnish has additional absorbing effects for radiation and also will increase the sensors' effectiveness. The layer of varnish should be absorbent for radiation with a wavelength greater than approximately 3 μm, but is transparent for visible light and infrared radiation with wavelengths shorter than the 3 μm wavelength.

Although various minor modifications may be suggested by those versed in the art, it should be understood that we wish to embody within the scope of the patent granted hereon all such modifications as reasonably and properly come within the scope of our contribution to the art.

We claim:

1. A pyrodetector for the detection of a body which has a temperature differing from that of the environment, said pyrodetector comprising a concave mirror having a curve surface selected from a group consisting of a spherical surface, a spherical-parabolic surface and curve surfaces between a spherical surface and a spherical-parabolic surface, said curve surface having an optical axis and a great circle with a plane being in said optical axis, said mirror having a wide-angle property essentially in one plane, a sensor having electrical connections, said sensor being provided on a foil of a pyroelectric material in an arc having a center point of curvature, support means for positioning the foil in a self-supporting fashion at least in the region of the sensor in a plane coinciding with the plane of the great circle of the mirror with the optical axis of the mirror lying in the plane of the foil and with the center of curvature of the arc coinciding with the center of curvature of said great circle.

2. A pyrodetector according to claim 1, wherein the sensor is formed by a sensor array comprising a plurality of individual connected sensor elements.

3. A pyrodetector according to claim 1, wherein the support means comprises a frame on which the foil is stretched.

4. A pyrodetector according to claim 1, wherein the foil is a polyvinylidene fluoride foil.

5. A pyrodetector according to claim 2, wherein the foil is a substrate composed of silicon which is coated with a lead titanate at least in the region of the sensor.

6. A pyrodetector according to claim 1, wherein the concave mirror is a spherical mirror.

7. A pyrodetector according to claim 6, wherein the concave mirror has an outer contour of a spherical rectangle.

8. A pyrodetector according to claim 1, wherein the concave mirror is a spherical-parabolic mirror whose curve surface is that area which occurs from a rotation of a parabola, which has an apex, a focal point and an axis of symmetry, a second axis, said second axis being on the plane of the parabola and extending perpendicular to the axis of symmetry and intersects the axis of symmetry at a point which is spaced from the apex of the parabola by a distance greater than the distance of the focal point from said apex.

9. A pyrodetector according to claim 1, wherein the concave mirror has an intermediate form between a spherical-parabolic curved surface and a spherical curved surface.

10. A pyrodetector according to claim 1, wherein the support means for the foil of the sensor extends through the mirror along the axis of the mirror.

11. A pyrodetector according to claim 1, wherein the support means for the foil with the sensor positions the foil and sensor with radiation to be detected being incident into the mirror impinging on both surfaces of the sensor elements.

12. A pyrodetector according to claim 1, wherein the sensor includes a plurality of individual elements, each of said individual elements being individually electrically connected.

13. A pyrodetector according to claim 12, wherein each of the sensor elements has at least one lead of its own.

14. A pyrodetector according to claim 13, which includes a separate pre-amplifier for each of the sensor elements.

15. A pyrodetector according to claim 1, wherein the sensor comprises a plurality of first sensing elements, each of said first sensing elements having individual electrical connections, said pyrodetector further including a compensation sensor including a second sensing element for each of the first sensing elements, said second sensing element including electrodes arranged on the surface of the foil adjacent the focussing spots of the concave curved surface of the mirror but at a location outside of said focussing spots.

16. A pyrodetector according to claim 1, wherein said sensor has a plurality of sensing elements having electrodes, said electrodes being rendered absorbent for a radiation to be detected.

17. A pyrodetector according to claim 16, wherein the electrodes are covered with a layer of zapon varnish.

18. A pyrodetector according to claim 1, which includes a compensation sensor.

19. A pyrodetector according to claim 16, wherein the electrodes are covered with a layer of varnish which is absorbent for radiation with wavelength greater than approximately 3 μm but which is transparent for visible and infrared radiation with wavelength shorter than said 3 μm wavelength.

20. A pyrodetector according to claim , wherein the foil contains polyvinylidene fluoride polymer.

21. A pyrodetector according to claim 1, wherein the sensor comprises a single arc-shaped sensor element.

22. A pyrodetector according to claim 21 which includes a compensation sensor with the same area as the sensor element.

23. A pyrodetector according to claim 21, wherein said sensor element has electrodes being rendered absorbent for a radiation to be detected.

24. A pyrodetector according to claim 23, wherein the electrodes are covered with a layer of zapon varnish.

25. A pyrodetector according to claim 23, wherein the electrodes are covered with a layer of varnish which is absorbent for radiation with wavelength greater than approximately 3μm but which is transparent for visible and infrared radiation with wavelengths shorter than said 3 μm wavelength.

26. A pyrodetector according to claim 21, wherein the support means for the foil with the sensor position the foil and sensor with radiation to be detected being incident into the mirror impinging on both surfaces of the sensor elements.

* * * * *